UNITED STATES PATENT OFFICE.

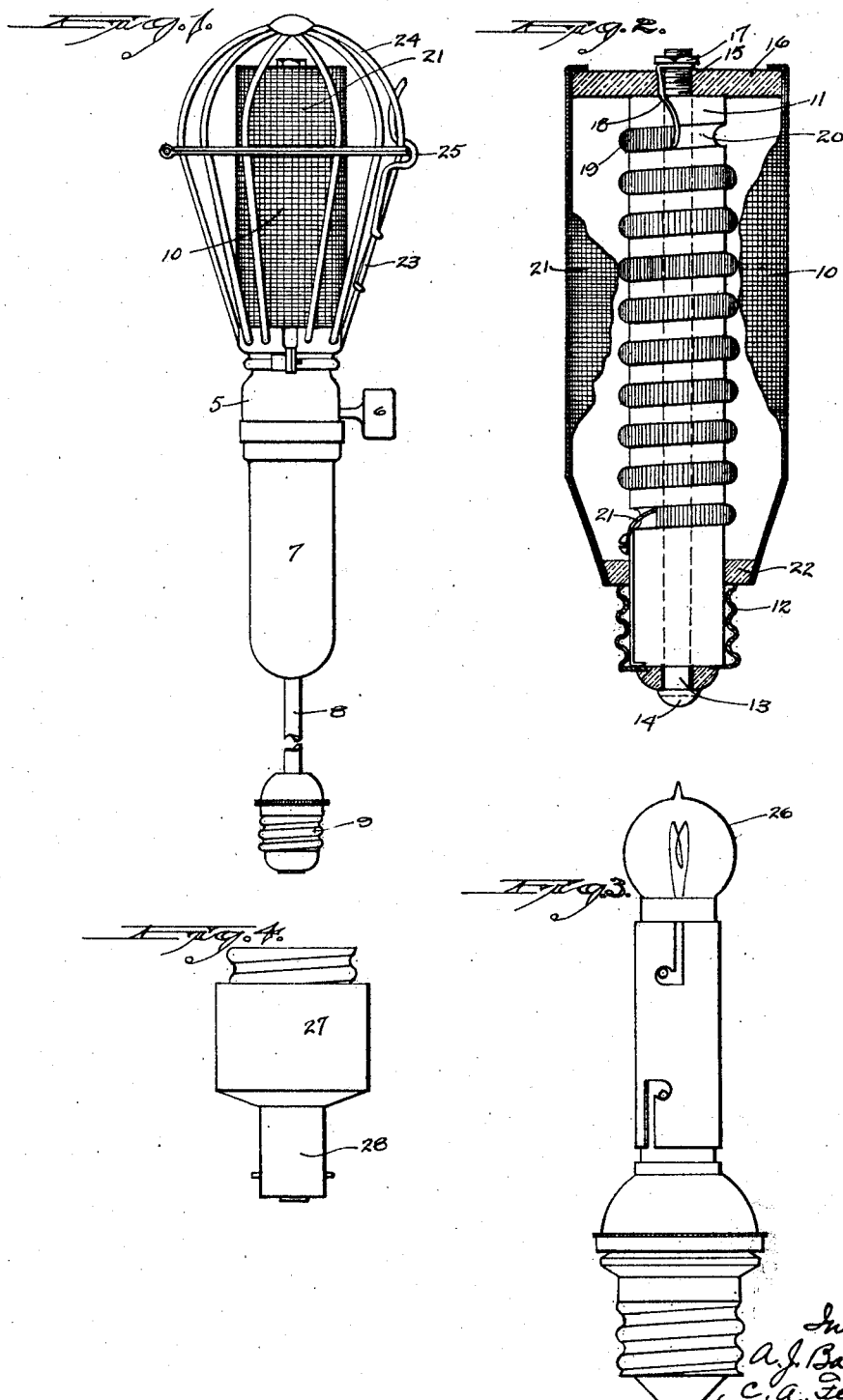

ALBERT J. BARNES AND CHARLES A. FEDDER, OF WEST HAVEN, CONNECTICUT, ASSIGNORS TO THE FARADAY CO., OF NEW HAVEN, CONNECTICUT, A CORPORATION.

ELECTRIC HEATER AND TROUBLE-LAMP.

1,359,780.   Specification of Letters Patent.   Patented Nov. 23, 1920.

Application filed April 5, 1920. Serial No. 371,361.

*To all whom it may concern:*

Be it known that we, ALBERT J. BARNES and CHARLES A. FEDDER, citizens of the United States, residing at West Haven, in the county of New Haven and State of Connecticut, have invented a new and useful Improvement in Electric Heaters and Trouble-Lamps; and we do hereby declare the following, when taken in connection with the accompanying drawings and the characters of reference marked thereon, to be a full, clear, and exact description of the same, and which said drawings constitute part of this application, and represent, in—

Figure 1. A side view of an electric heater, constructed in accordance with our invention.

Fig. 2. An enlarged side view, partly in elevation and partly in section of the heating coil.

Fig. 3. A side view of a trouble lamp for substitution in place of the heater.

Fig. 4. A side view of a coupling piece for connecting the trouble lamp with the battery of an automobile.

This invention relates to an electric heater and trouble lamp for automobiles, the object being to provide a heating device which may be connected with a public service circuit and be placed in the hood of an automobile when in a garage to prevent freezing, and a device from which the heating coil may be removed and replaced by a lamp with means for connection with the batteries of the automobile, so that the lamp may be used as a so-called trouble lamp, and the invention consists in the construction and arrangement of parts as hereinafter described and particularly recited in the claims.

In carrying out our invention, we employ a socket 5 of usual construction provided with the usual key 6 and mounted at the outer end of a grip or handle 7 through which the circuit wire 8 extends to a screw plug 9 or other means for connection with a public service circuit. Mounted on the socket 5 is a heater 10 comprising a central core 11 of porcelain or other suitable material provided at its inner end with a screw threaded metal sleeve 12 adapted to be screwed into the socket 5 so as to have electrical connection therewith in the usual manner. Extending through the core is a metal rod 13 the inner end 14 of which is adapted to engage with the contact in bottom of the socket, while the outer end 15 extends through a washer 16 on the outer end of the core. The outer end is threaded to receive a nut 17 whereby the outer end 18 of the coil 19 may be connected with the outer end of the rod 13, the said coil being spirally wound around the core and seated in a spiral groove 20 therein. The inner end 21 of the coil is electrically connected with the sleeve 12 so that a circuit is made through the coil which becomes hot.

The core is inclosed by a wire gauze housing 21 which is supported by the washer 16 and by a washer 22 mounted on the core 11 near the inner end thereof. The heating device is protected by a wire cage 23 secured to the socket 5 and provided with a wire cover 24 which may be locked in place by a wire latch 25.

When desired the heater may be removed from the socket 5 and a low voltage lamp 26 inserted in its place. The plug 9 will then be connected with a coupling piece 27 which is adapted at its inner end 28 to be connected with the battery of the automobile so as to produce sufficient light for the purpose of a trouble lamp.

We thus provide in a simple and compact form a heating device and trouble lamp for the purposes mentioned.

We claim:—

1. The combination with a grip of a socket at the outer end thereof, a heater adapted to be connected with said socket and comprising a core, a sleeve on the inner end of said core, a rod extending through said core, a heating coil wound around said core one end of the coil connected to the outer end of said rod and the other end connected with said sleeve, and a wire cage inclosing said heater.

2. An electric heater adapted to be connected with a service circuit and comprising a non-fusible core, a sleeve on the inner end of said core, a rod extending through said core, a heating coil wound around said core, one end of the coil connected to the outer end of said rod and the other end connected with said sleeve, and a gauze housing inclosing said core.

3. The combination with a grip of a socket at the outer end thereof, said socket adapted to receive a heater or a trouble lamp, wires extending from said socket to a plug, said plug adapted to be connected with a service circuit or with a battery substantially as described.

In testimony whereof, we have signed this specification in the presence of two subscribing witnesses.

ALBERT J. BARNES.
CHARLES A. FEDDER.

Witnesses:
AMELIA C. ROEHNER,
MAY KELLOGG ARNOLD.